(12) United States Patent
Kondapalli

(10) Patent No.: US 7,876,686 B1
(45) Date of Patent: Jan. 25, 2011

(54) MESSAGE PROCESSING

(75) Inventor: Raghu Kondapalli, San Jose, CA (US)

(73) Assignee: Marvell International, Ltd. (BM)

( * ) Notice: Subject to any disclaimer, the term of this patent is extended or adjusted under 35 U.S.C. 154(b) by 96 days.

(21) Appl. No.: 12/276,955

(22) Filed: Nov. 24, 2008

Related U.S. Application Data

(60) Provisional application No. 61/017,362, filed on Dec. 28, 2007.

(51) Int. Cl.
*H04J 3/14* (2006.01)
(52) U.S. Cl. .................................... 370/235.1
(58) Field of Classification Search ........................ None
See application file for complete search history.

(56) References Cited

U.S. PATENT DOCUMENTS

| 2003/0076848 A1* | 4/2003 | Bremler-Barr et al. ...... 370/412 |
| 2008/0031132 A1* | 2/2008 | Compton et al. ............. 370/230 |
| 2008/0235699 A1* | 9/2008 | Jeong et al. .................. 718/104 |

* cited by examiner

*Primary Examiner*—Jianye Wu

(57) ABSTRACT

Devices, systems, methods, and other embodiments associated with message processing are described. In one embodiment, an apparatus includes an interaction logic to interact with a message associated with an isochronous stream. The message is associated with a class of information provided on the isochronous stream. The apparatus includes a history logic to monitor messages associated with the class of information. The history logic determines a class history for the class of information. The apparatus includes a process logic to selectively process the message based on the class history.

29 Claims, 14 Drawing Sheets

MESSAGE PROCESSING

CROSS REFERENCE TO RELATED APPLICATIONS

This application claims the benefit of U.S. provisional application Ser. No. 61/017,362 filed on Dec. 28, 2007, which is incorporated by reference in its entirety.

BACKGROUND

Applications including video conferencing, video telephony, and other applications that transmit video may process video data. An isochronous stream may be used to carry the video data. The video data may be routed through a network that includes one or more network devices. The network devices may include, for example, switches, routers, network interface cards, and so on. Representing an image may require large amounts of video data. A network device routing the video data may become overwhelmed with the large amount of video data.

Video quality may suffer when the network device is overwhelmed. Also, momentary bursts of traffic may tie up a port in a network device. While tied up, the port is not available to other streams of video data being processed in the network device. Network resources may also need to be protected from being abused by traffic profile violating streams.

A Stream Registration Protocol (SRP) has been developed to provide a reliable network quality of service. Isochronous streams may be provisioned in the network device using the SRP. The isochronous stream is provisioned before the actual data exchange with the network device occurs.

During a stream registration phase, an SRP software layer determines whether the hardware has adequate resources to handle a new data stream. The determination includes summing a data rate of the isochronous streams provisioned for a given port. The summation may then be used as a threshold. The threshold may determine whether incoming isochronous traffic is accepted for a given port. Despite careful calculations in the SRP for configuring bandwidths for each isochronous stream, inherent momentary traffic bursts introduced by the network may still overwhelm a port. The momentary traffic burst may still exceed a Committed Information Rate (CIR) for a given time slot window. When the CIR is exceeded, network data may be affected. For example, video quality may suffer. A more efficient way of processing network data may be desired.

SUMMARY

In one embodiment, an apparatus includes an interaction logic to interact with a message associated with an isochronous stream. The message is associated with a class of information provided on the isochronous stream. The apparatus includes a history logic to monitor messages associated with the class of information. The history logic determines a class history for the class of information. The apparatus includes a process logic to selectively process the message based on the class history.

In one embodiment, the message may be rejected or accepted with qualifications. For example, the message may be accepted when the class history is below a first threshold and the message may be accepted with qualifications when a value of the class history is between the first threshold and a second threshold. The message may be rejected when the class history is above the second threshold. The first threshold may be a committed burst size (CBS) limit and the second threshold may be an excess burst size (EBS) limit.

In another embodiment, the apparatus may detect a packet that belongs to a packet class and increment a bucket count. The packet class may be associated with a class time slot interval and/or with quality of service. The apparatus decreases the bucket count at the end of the class time slot interval. The apparatus determines a port utilization value based on the bucket count and selectively processes the packet based on the port utilization value.

Another embodiment includes a method. The method includes receiving a packet that may belong to a packet class and be associated with a class time slot interval and/or a quality of service property. A packet size of the packet received is added to a bucket count that may be associated with the packet class. A CBS limit is subtracted from the bucket count at the end of a time slot interval. A port utilization value is determined based on the bucket count. The packet is processed based on the port utilization value. Upon determining that the port utilization value is below a first threshold value, a stream of traffic that may be associated with the packet is provisioned. The stream of traffic may be provisioned using a SRP. Upon determining the port utilization value is above an EBS limit, the packet is dropped. Upon determining that the port utilization value is between the first threshold and a second threshold, the packet is forwarded and a flow control message is sent to a source of the packet. Upon determining that the port utilization value is above the second threshold, the packet is rejected and a flow control message is sent to a source of the packet.

In another embodiment, the first threshold is a CBS limit and the second threshold is an EBS limit.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
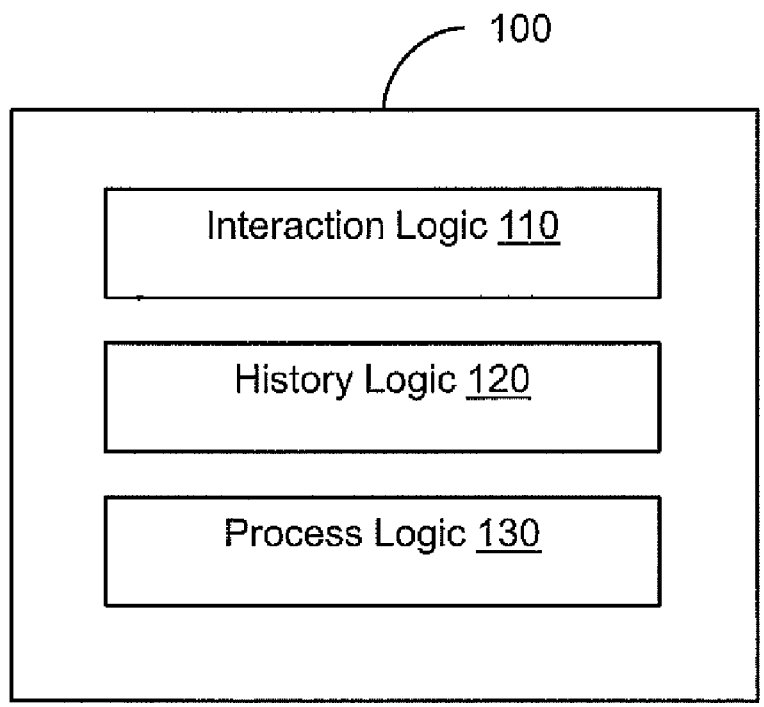
FIG. 1 illustrates one embodiment of an apparatus associated with message processing.

Described herein are example systems, methods and other embodiments associated with selectively processing messages. Messages may be associated with an isochronous stream. An isochronous stream assigns slots for each data source transmitting data over the isochronous stream. The isochronous stream repeatedly cycles through each of the slots in a regular order when transmitting data. An isochronous stream is a data transmission/reception that is time aware or time sensitive (e.g. time-dependent data, audio/video data). The isochronous stream may have a class time slot interval. The definition of class time slot is application specific. For example, the time slot interval may range from 62.5 micro-seconds to 1 millisecond.

In one embodiment, a measurement of the throughput of the isochronous stream may be made in bits per class time slot interval. The measurement may indicate a utilization level of the isochronous stream. Determining a utilization level based on bits per class time slot interval may be called Interval Time Slot Metering (ITSM).

In one embodiment, an ITSM logic monitors the bits per class time slot interval of the isochronous stream. The ITSM logic may accept messages from a new stream when the bits per class time slot interval is below a threshold value. Accepting messages when the bits per class time slot interval is below a threshold value ensures that packet memory pointers in packet memory and other network resources are protected from being abused. Accepting messages based on a threshold value also ensures that the rest of the isochronous streams belonging to a different class and/or non-isochronous streams are not affected by a momentary burst in isochronous traffic that belongs to another class.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an (application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can read.

"Logic", as used herein, includes but is not limited to hardware, firmware, software stored or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

FIG. 1 illustrates one embodiment of an apparatus 100 associated with selectively processing a message. The apparatus 100 may be part of a network. The apparatus 100 may be receiving and rerouting video data messages. The messages may at times arrive in bursts. The apparatus 100 includes an interaction logic 110. The interaction logic 110 interacts with a message associated with an isochronous stream processed by the apparatus 100. The message is associated with a class of information provided on the isochronous stream. In one embodiment, the interaction logic 110 may receive the message.

In one embodiment, the apparatus 100 includes a history logic 120. The history logic 120 monitors messages associated with the class of information. The history logic 120 determines a class history for the class of information as processed by the apparatus 100. In one embodiment, the history logic 120 determines a bucket value associated with the class history. The history logic 120 may increase the bucket value when the message is received and/or may decrease the bucket value at the end of a class time slot interval. The class time slot interval may be associated with the isochronous stream. In another embodiment, the history logic 120 monitors messages associated with the class of information on the port.

The apparatus 100 includes process logic 130. The process logic 130 selectively processes the message based on the class history. For example, the process logic 130 may accept the message, reject the message, or accept the message with qualifications. The message may be accepted based on the class history. In one embodiment, the process logic 130 accepts the message when a value of the class history is below a first threshold. The process logic 130 accepts the message with qualifications when a value of the class history is between the first threshold and a second threshold. The process logic 130 rejects the message when a value of the class history is above the second threshold. In one embodiment, the first threshold is a committed burst size (CBS) limit and the second threshold is an excess burst size (EBS) limit. The operation of the apparatus 100 as described above may be called Interval Time Slot Metering (ITSM).

Figure 2:
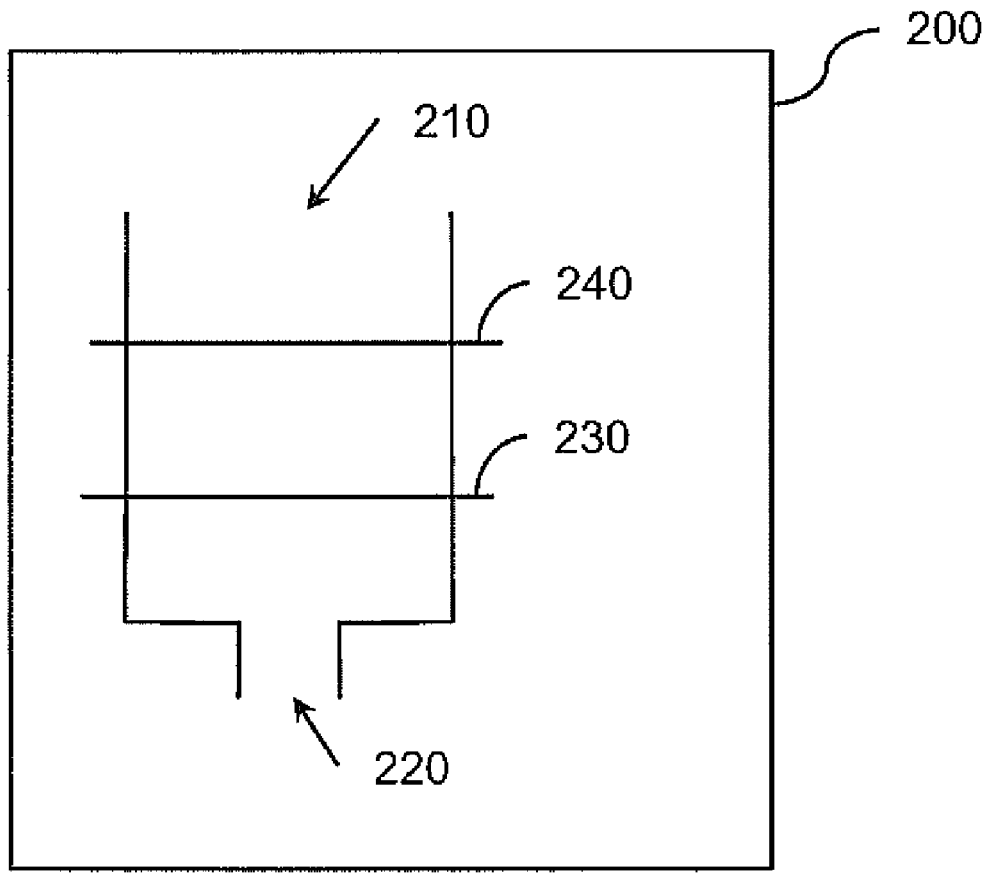
FIG. 2 illustrates one embodiment of a bucket associated with message processing.

In one embodiment, the class history value may be associated with a bucket 200 as shown in FIG. 2. The bucket 200 has an opening 210 and an outlet 220. The class history may be represented by bucket value. The bucket value may be represented by a level of tokens in the bucket 200. In one embodiment, when the apparatus 100 is initialized, the token level of the bucket is set to zero or a selected starting point.

For example, when a message is received by the interaction logic 110, tokens (or token credits) may be added to the bucket 200. In one embodiment, the number of tokens added for a message may represent or be equal to the message size and may be expressed in bytes or other size value. In another embodiment, one token may be added per message received. In one embodiment, tokens flow out of the outlet 220 at a constant rate. In one embodiment, tokens are removed from the bucket 200 at the end of the class time slot interval.

The process logic 130 may process the message based on the tokens in the bucket 200. The first threshold may be represented by first level 230 of tokens and the second threshold may be represented by a second level 240 of tokens. The process logic 130 accepts the message when the token level is below the first level 230. The process logic 130 accepts the message with qualifications when the token level is between the first level 230 and the second level 240. The process logic 130 rejects the message when a value of the token level is above the second level 240. In one embodiment, the first level is a committed burst size (CBS) limit and the second level is an excess burst size (EBS) limit.

In some embodiments, the history logic 120 and the process logic 130 may implement the algorithms expressed in the following pseudo code:

Function ITSM_ALGORITHM begin
    If (CTSEvent & (~PktArrived|(PktArrived & ~PriMaskMatch)))
    // CTSEvent corresponds to beginning of every class time slot.
    // PktArrived signal takes into consideration if an ingress packet arrived
    // belonging to this class.
    // PriMaskMatch indicates if the incoming packets priority matches with the
    // PriMask bit for this bucket.
    // PriMask is a value for setting a priority mask.
    If (CurrBktDepth≧CBSLimit)
    // CBSLimit is the committed burst size (CBS) limit.
        CurrBktDepthNew=(CurrBktDepth−CBSLimit)
        // CurrBktDepth and CBSlimit are from bkt status and configuration
        // registers
    else
        CurrBktDepthNew=0;
    else if (~CTSEvent & (PktArrived & PriMaskMatch))
        CurrBktDepthNew=(CurrBktDepth+PktBytes);
        // CurrBktDepthNew is the new current bucket depth.
        // PktBytes is number of bytes of the incoming packet noted by
        // ingress.
        Function PKTDECISION( );
    else if (CTSEvent & (PktArrived & PriMaskMatch))
        if (CurrBktDepth≧CBSLimit)
            CurrBktDepthNew=(CurrBktDepth+PktBytes−CBSLimit);
        else
            CurrBktDepthNew=PktBytes
        Function PKTDECISION( );
end Function PKTDECISION begin
    If (CurrBktDepthNew≦CBSLimit)
    ITSM_DROP=0;
    // ITSM_DROP signals to drop the incoming message.
    else if (~ActionMode)
    // ActionMode is a register bit indicating to accept the message event
    // when the new current bucket depth is above the CBS limit.
    ITSM_DROP=1;
    else if (CurrBktDepthNew≦EBSLimit)
    // EBSLimit is from bucket configuration registers
    ITSM_DROP=0;
    CurrBktDepth=CurrBktDepthNew;
    else
    ITSM_DROP=1;
end // Note that calculations are assumed to be unsigned and CurrBktDepth
    // value gets capped at zero.

Figure 3:
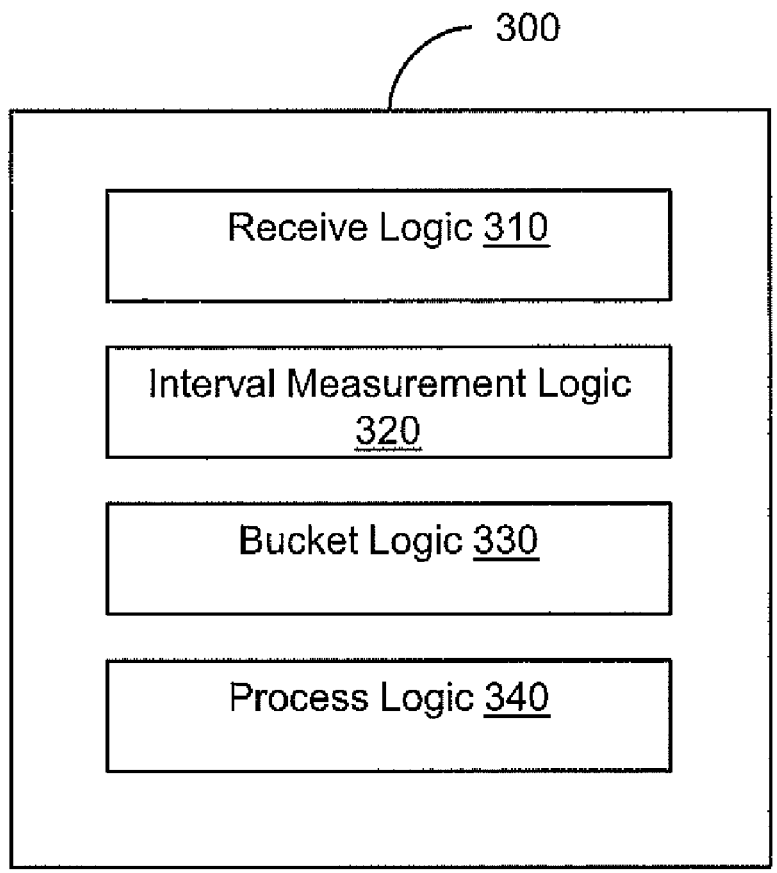
FIG. 3 illustrates another embodiment of an apparatus associated with message processing.

FIG. 3 illustrates an embodiment of an apparatus 300 that processes messages. The apparatus 300 includes a receive logic 310 to receive a packet. The packet may be associated with an isochronous stream. The packet may belong to a packet class. The receive logic 310 adds a first value to a bucket count. The first value may be the packet size measured in bytes. The bucket count is associated with the packet class. The packet class may be associated with a class time slot interval. The class time slot interval may be 62.5 micro-seconds, 125 micro-seconds, 250 micro-seconds, and 1 millisecond. Of course, other time slot intervals can be used depending on a particular application. The packet class may be associated with a quality of service property.

The apparatus 300 includes an interval measurement logic 320. The interval measurement logic 320 may subtract a second value from the bucket count. The second value may be subtracted at the end of the class time slot interval. The interval measurement logic 320 may prevent the bucket count from going below zero by clipping negative bucket count values to zero. The bucket count may be associated with the bucket 200 discussed above. In one embodiment, the second value is a committed burst size (CBS) limit.

The apparatus 300 includes a bucket logic 330. The bucket logic 330 determines a port utilization value. The port utilization value may be based on the bucket count.

The apparatus 300 includes a process logic 340. The process logic 340 selectively processes the packet. The packet may be processed based on the port utilization value. The process logic 340 may compare the port utilization value to a first threshold and a second threshold. The first threshold may be the committed burst size (CBS) limit and the second threshold may be an excess burst size (EBS) limit. The process logic 340 may accept the packet when the port utilization value is below the first threshold.

The process logic 340 may accept the packet and forward the packet when the process logic 340 determines that the port utilization value is between the first threshold and the second threshold. In one embodiment, the process logic 340 may send a flow control message to a source of the packet when the port utilization value is between the first threshold and the second threshold. The flow control message may let the source of the packet know that the apparatus 300 is busy. The flow control message may indicate that subsequent messages sent from the source of the packet to the apparatus 300 may be dropped.

The process logic 340 may determine that the port utilization value is above the second threshold. The process logic 340 may reject the packet when the port utilization value is above the second threshold. The process logic 340 may drop the packet when the port utilization value is above an excess burst size (EBS) limit. When the packet is dropped, the packet is not sent back to a source of the packet. In one embodiment, the process logic 340 rejects the packet. The process logic 340 may also send a flow control message to the source of the packet. The flow control message may let the source of the packet know that the packet has been rejected.

In one embodiment, the bucket count may be based, in part, on token credits as previously described. In one embodiment, the apparatus 300 will not flush unused token credits from the bucket count between class time slot intervals.

In one embodiment, the process logic 340 may selectively provision (e.g. configure) a stream of traffic associated with the packet. The process logic 340 may provision the stream of traffic using a stream registration protocol (SRP). The process logic 340 may selectively provision the stream of traffic when the port utilization value is below a threshold value. The process logic 340 may selectively provision the stream of traffic before accepting the stream of traffic. In one embodiment, the apparatus 300 is Institute of Electrical and Electronics Engineers (IEEE) 802.1p compliant.

In another embodiment, the apparatus 300 is software configurable. The apparatus 300 may include registers that may be written by software. The apparatus 300 may include an interval time slot metering (ITSM) mode register. The ITSM mode register includes an ITSM bit. The apparatus 300 operates in the ITSM mode as described above when the ITSM bit is one. In one embodiment, the bucket 200 may be drained at the class time slot (CTS) Interval.

The apparatus 300 may operate in a port ingress rate limiting (PIRL) mode. The apparatus 300 operates in the PIRL mode when the ITSM bit is zero. In the PIRL mode, the message traffic through a port in the device may be rate limited. The PIRL mode rate limiting may not depend on a class of information.

The apparatus 300 may include a class time slot register. The value of the class time slot interval may be selected by writing a value to the class time slot register. In another embodiment, the class time slot register selects the value of the class time slot interval by setting two control bits in the class time slot register. The two control bits may be class time slot register bits five and four. The value of the class time slot interval is 62.5 micro-seconds when bits five and four are zero. The value of the class time slot interval is 125 micro-seconds when bit five is zero and bit four is one. The value of the class time slot interval is 250 micro-seconds when bit five is one and bit four is zero. The value of the class time slot interval is 1 millisecond when bit five is one and bit four is one. In one embodiment, a timer generates the class time slot interval based on a reference clock from a precise timing protocol (PIP) block. One of ordinary skill in the art will appreciate that in some examples more than two bits may be used to select the class time slot interval. One of ordinary skill in the art will also appreciate that in some examples bits other than bits five and four may be used to select the class time slot interval.

In one embodiment, the apparatus 300 may be implemented in a chip. A chip is a set of micro-miniaturized electronic circuits fabricated on a single piece of semiconductor material. In another embodiment, the apparatus 300 is operably connected to a processor in a chip. In some embodiments, the apparatus 300 may be an integrated circuit. In some embodiments, the apparatus 300 may be a router, a switch, a gateway, and a network interface card (NIC). In other embodiments, the apparatus 300 is implemented in a high definition television (HDTV), a vehicle, a cellular phone, a set top box, a media player, or a Voice over Internet Protocol (VoIP) phone. For example, the apparatus 300 may be implemented in a high definition television to processes video packets.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 4:
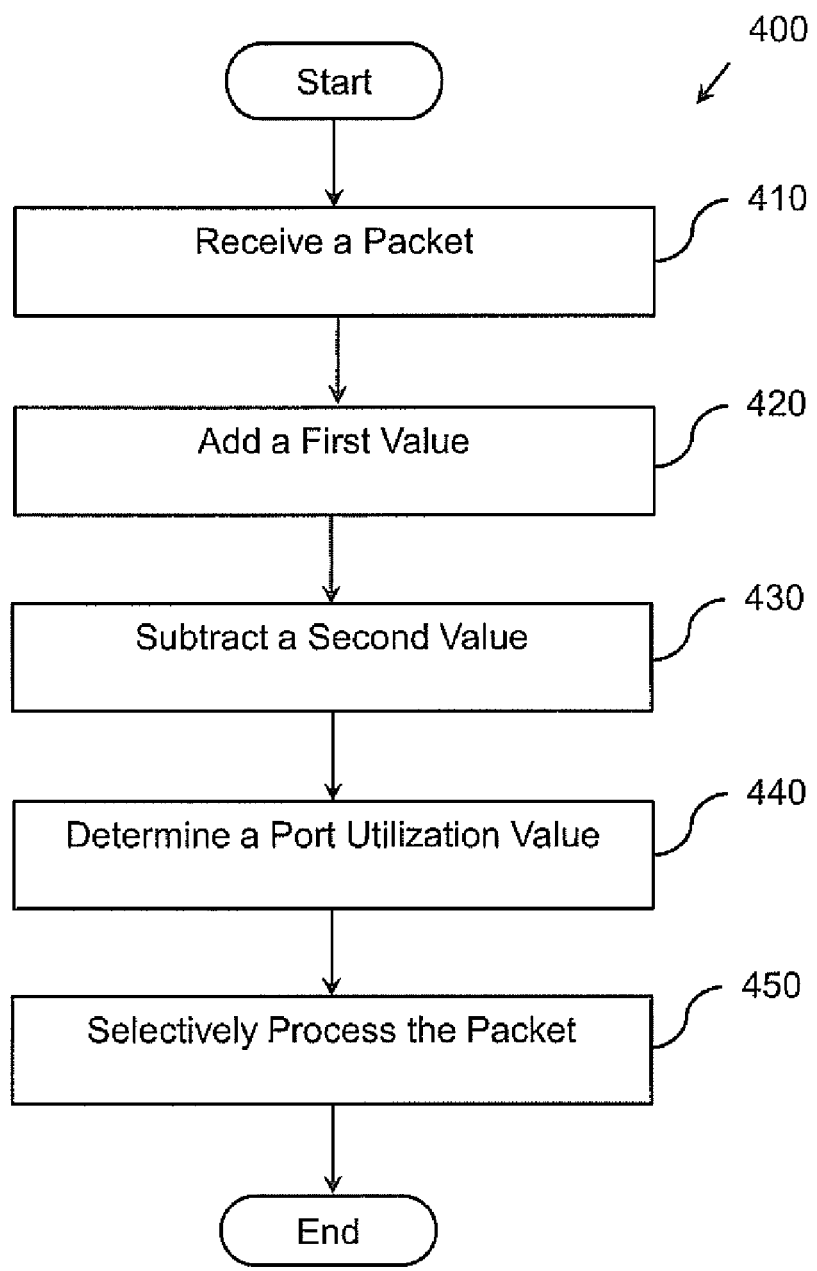
FIG. 4 illustrates an embodiment of a method associated with message processing.

FIG. 4 illustrates an example method 400 to process messages. The method 400 includes, at 410, receiving a packet. The packet may be associated with an isochronous stream. The packet may also belong to a packet class. In one embodiment, the packet class may be associated with a class time slot interval. In another embodiment, the class time slot interval may be 62.5 micro-seconds, 125 micro-seconds, 250 micro-seconds, or 1 millisecond. The packet class may also be associated with a quality of service property.

The method 400 also includes, at 420, adding a value to the bucket count. The packet size may be added to the bucket count. The packet size may be associated with the packet class. The packet size may be measured in bytes. In some embodiments, the addition, at 420, is performed after the packet is received. In another embodiment, token credits are added, at 420, to the bucket when the packet is received. The bucket count may depend, at least in part, on token credits.

The method 400 includes, at 430, subtracting a value from the bucket count. The value subtracted may be a committed burst size (CBS) limit. The subtraction may be performed at the end of the class time slot interval. The method 400 may prevent the bucket count from going below zero by clipping negative bucket count values to zero. In another embodiment, token credits are subtracted, at 430, from the bucket at the end of a class time slot interval. In one embodiment, unused token credits are not flushed from the bucket count between class time slot intervals.

The method 400 includes determining, at 440, a port utilization value. The port utilization value is based on the bucket count. The packet may be selectively processed based on the port utilization value. A stream of traffic may be provisioned based on determining, at 450, that the port utilization value is below a first threshold. The stream of traffic is associated with the packet. The stream of traffic may be provisioned using a stream registration protocol (SRP).

In one embodiment, the method 400 drops, at 450, the packet when the port utilization value is determined, at 440, to be above an excess burst size (EBS) limit. The method 400 may forward, at 450, the packet when the port utilization value is determined, at 440, to be between the first threshold and a second threshold. In some embodiments, the method 400 may send, at 450, a flow control message to a source of the packet. In one embodiment, the first threshold is a committed burst size (CBS) limit and the second threshold is an excess burst size (EBS) limit.

The method 400 may reject, at 450, the packet when the port utilization value is determined, at 440, to be above the second threshold. The method 400 may send, at 450, a flow control message to a source of the packet when the port utilization value is determined, at 440, to be above the second threshold.

The method 400 may be executed in a router, a switch, a gateway, a network interface card (NIC), a high definition television (HDTV), a vehicle, a cellular phone, a set top box, a media player, or a Voice over Internet Protocol (VoIP) phone. The method 400 may be Institute of Electrical and Electronics Engineers (IEEE) 802.1p compliant. The method 400 may also be executed in a chip. A chip is a set of microminiaturized electronic circuits fabricated on a single piece of semiconductor material.

Figure 5:
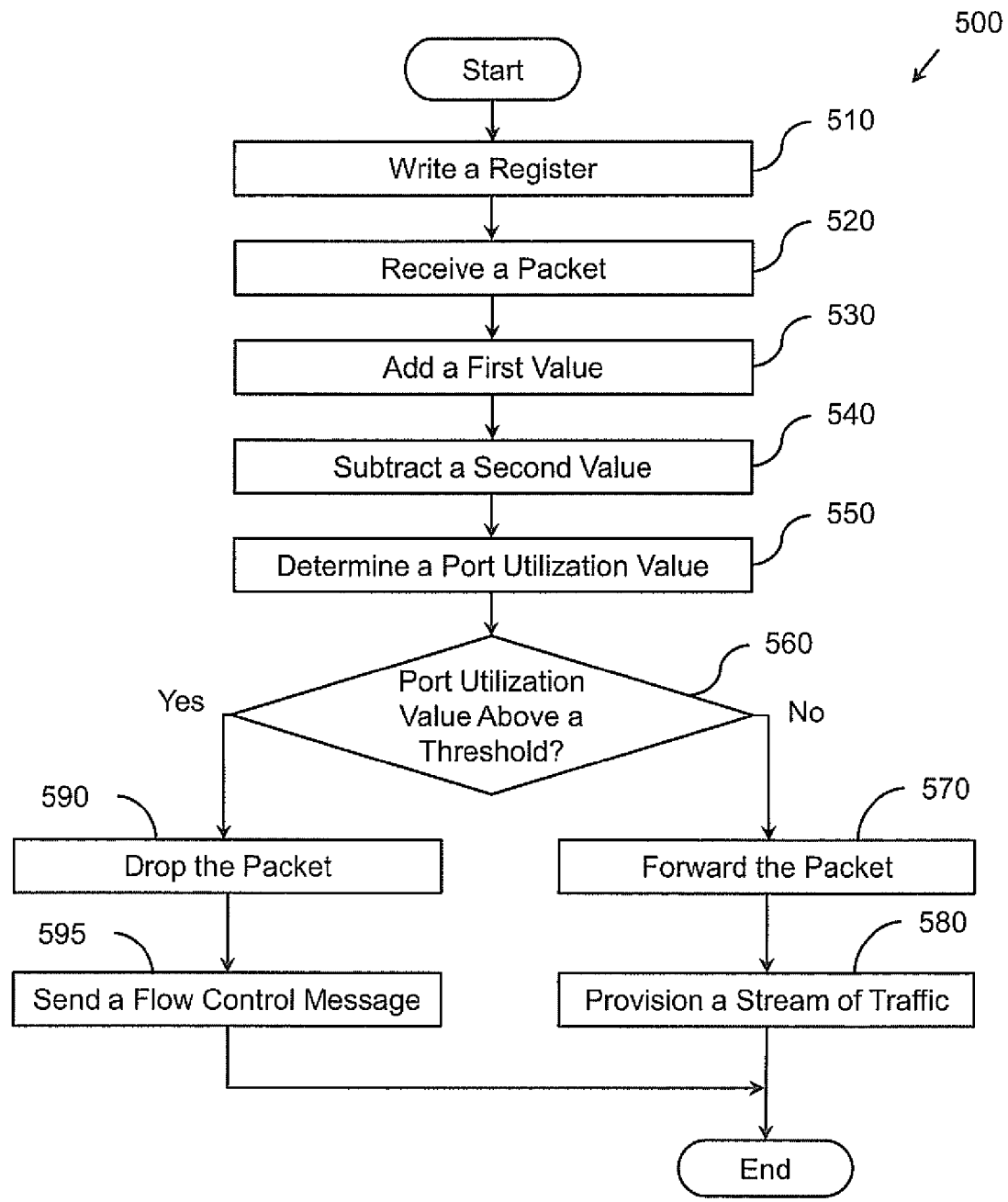
FIG. 5 illustrates another embodiment of a method associated with message processing.

FIG. 5 illustrates another example method 500 to process messages. The method 500 includes writing, at 510, a register. The register may be in an apparatus implementing the method. Writing the register may select a value of the class time slot interval.

The method 500, receives, at 520, a packet as discussed above in method 400. The method 500 also adds, at 530, a first value as discussed above. A second value is subtracted, at 540, as discussed above. A port utilization value is determined, at 550. The port utilization value may be determined as discussed above in method 400.

The method 500, determines, at 560, if the port utilization value is above a threshold. The packet is forwarded, at 570, if the port utilization value is below the threshold. The method 500, provisions, at 580, a stream of traffic.

The packet is dropped, at 590, if the port utilization value is above the threshold. A flow control message is sent, at 595. The flow control message is sent to an originator of the packet.

Figure 6:
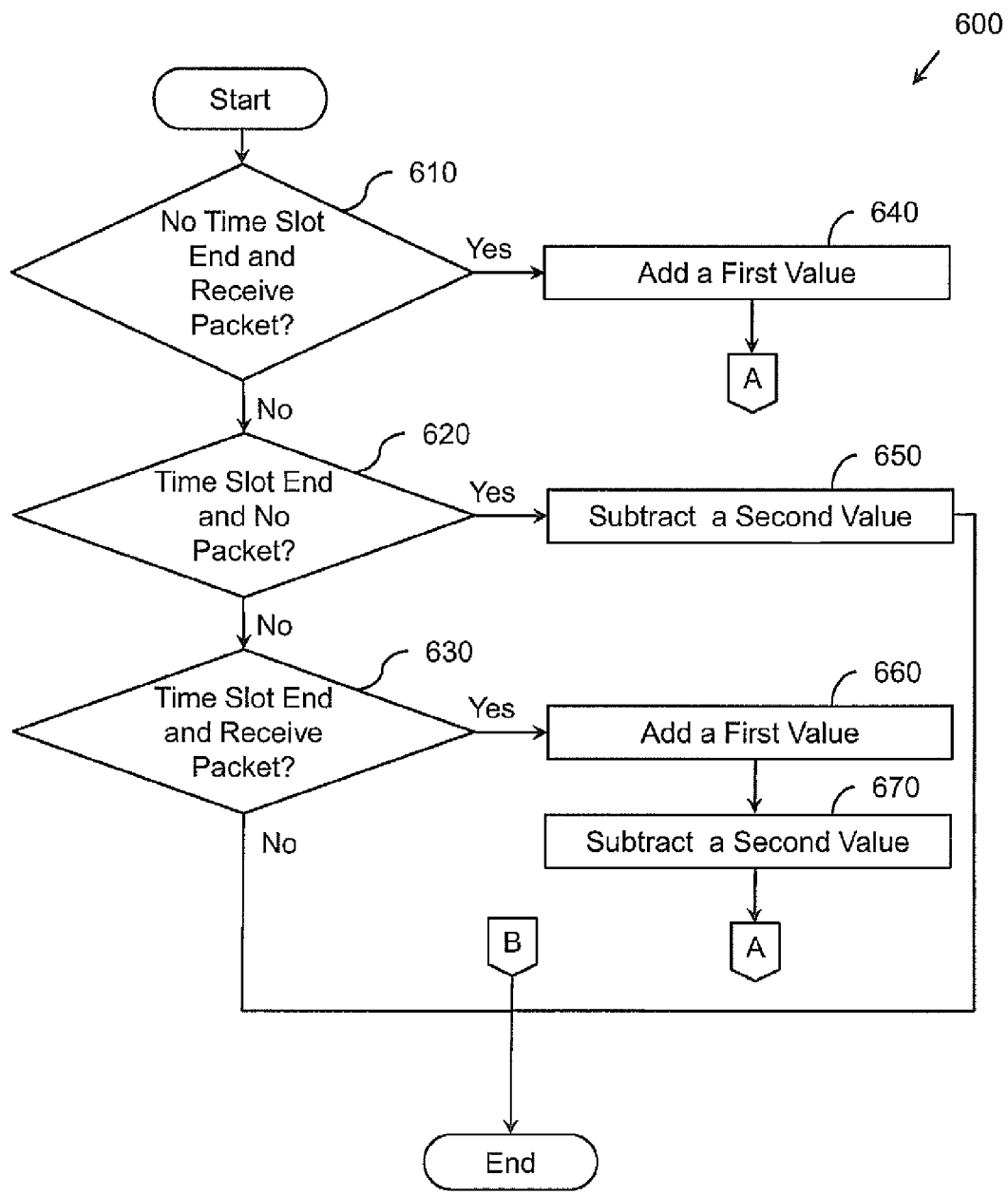
FIG. 6 illustrates another embodiment of a method associated with message processing.
Figure 7:
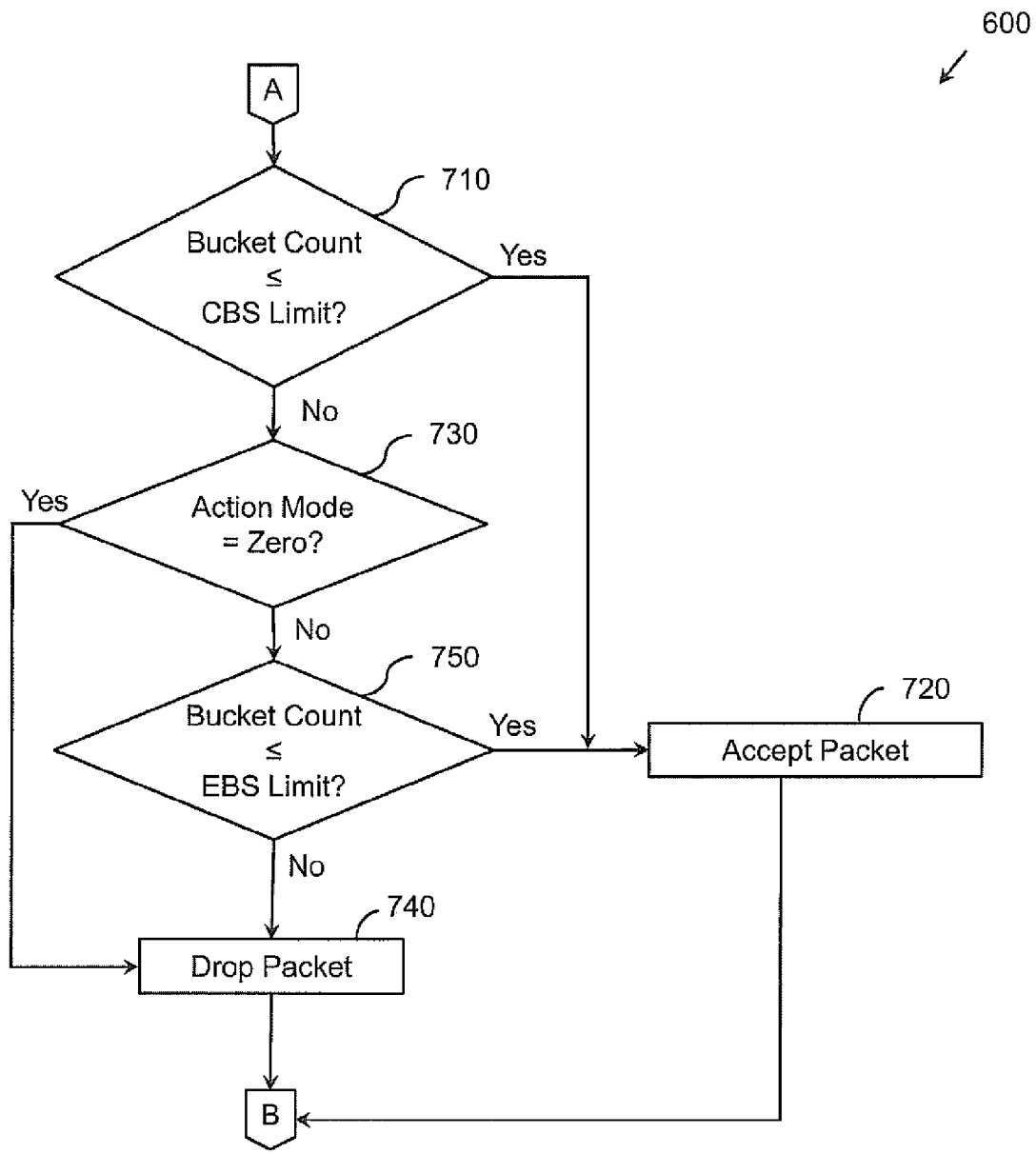
FIG. 7 illustrates another embodiment of a method associated with message processing.

FIGS. 6 and 7 illustrate another example method 600 to process messages. The method 600 makes a decision at 610, 620, and 630 based on whether the time slot has ended and whether a packet has been received. A time slot may correspond to a time slot as discussed above for method 400 and method 500.

A determination is made, at 610, to determine if a packet was received and there is no end of a time slot. A first value is added, at 640, when there is a received packet and there is no end of a time slot. The addition, at 640, increases a bucket count. After the addition at 640, the method 600 then proceeds to make a determination, at 710 (FIG. 7). A determination is made, at 620, to determine if no packet was received and there is an end of a time slot. A second value is subtracted, at 650, when there is no received packet and there is an end of a time slot. The second value may be subtracted from the bucket count. The method 600 ends after the subtraction at 650.

A determination is made, at 630, to determine if a packet was received and there is an end of a time slot. A first value is added, at 660, when there is a received packet and there is an end of a time slot. Next, at 670, the second value is subtracted from the bucket count. The method flow then proceeds to make a determination at 710 (FIG. 7). The method 600 ends when there is no received packet or there is no end of a time slot.

Turning now to FIG. 7, the method 600, determines, at 710, whether the bucket count equal to or less than the committed burst size (CBS) limit. The packet is accepted, at 720, when the bucket count is less than or equal to the CBS limit. A determination is made, at 730, when the bucket count is greater than the CBS limit.

A decision, at 730, is made as to whether an action mode is zero. The action mode may be a bit in a register. The packet is dropped, at 740, when the action mode is equal to zero. A decision is made at 750 when the action mode is not equal to zero.

The method 600, determines, at 750, whether the bucket count is less than or equal to the excess burst size (EBS) limit. The packet is accepted, at 720, when the bucket count is less than or equal to EBS limit. The packet is dropped, at 740, when the bucket count is greater than the EBS limit.

It will be appreciated that in one embodiment, the methods herein may be implemented as computer executable instructions embodied and stored on a computer-readable medium. When executed by a machine (e.g., processor, device) the instructions cause the machine to perform the methods herein and their equivalents. The methods can also be implemented with circuits.

Figure 8:
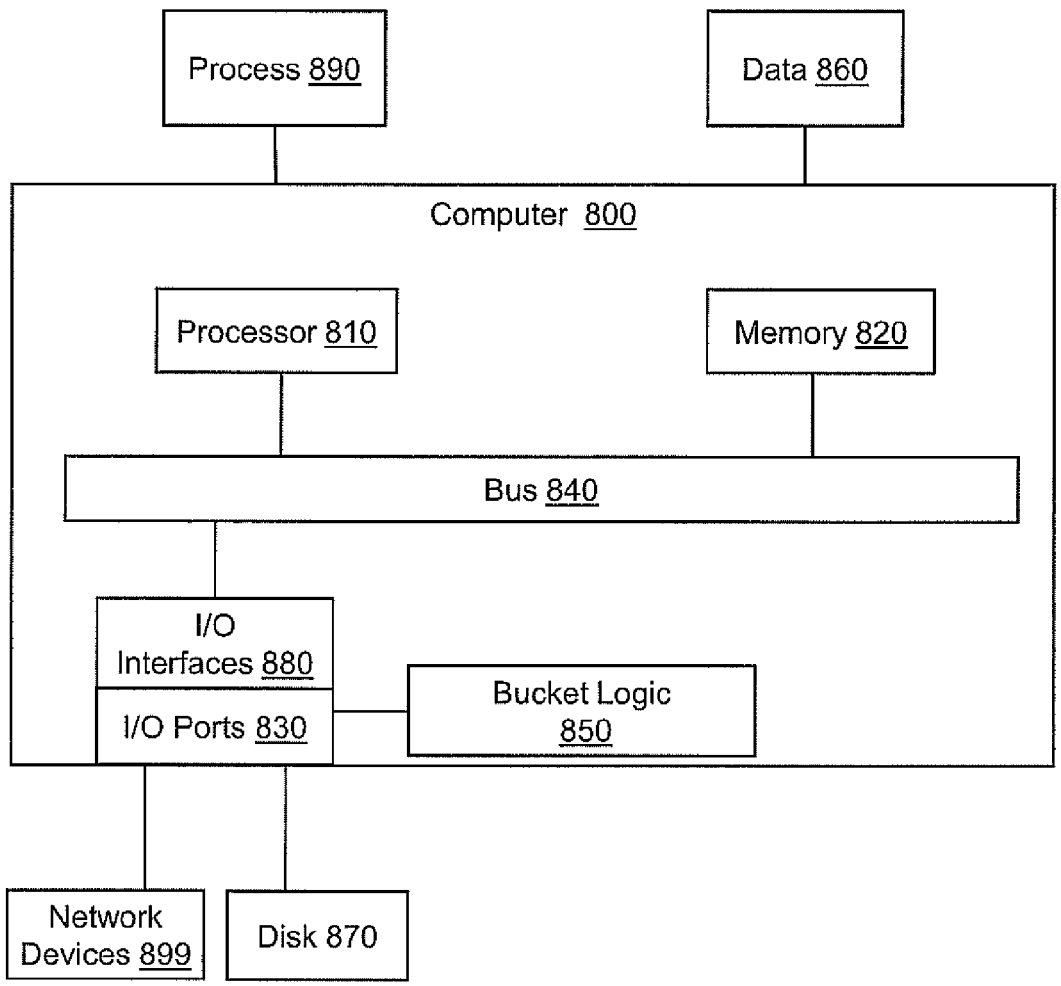
FIG. 8 illustrates one embodiment of a computing environment in which example systems and methods, and equivalents associated with message processing may be implemented.

FIG. 8 illustrates an example computing device in which example systems and methods described herein, and equivalents, may be implemented. The example computing device may be a computer 800 that includes a processor 810, a memory 820, and input/output ports 830 operably connected by a bus 840. In one example, the computer 800 may include a bucket logic 850 to process messages.

The bucket logic 850 provides means (e.g., hardware, stored software, firmware) for receiving a message and for processing the message. The bucket logic 850 can be implemented similar to the apparatus 100 or 300, and/or combinations of their features.

The bucket logic 850 can include logic implemented, for example, as an ASIC or other type of circuit.

Generally describing an example configuration of the computer 800, the processor 810 may be a variety of various processors including dual microprocessor and other multiprocessor architectures. A memory 820 may include volatile memory and/or non-volatile memory. Non-volatile memory may include, for example, read-only memory (ROM), programmable read only memory (PROM), erasable programmable read only memory (EPROM), electronically erasable programmable read only memory (EEPROM), and so on. Volatile memory may include, for example, random access memory (RAM), static random access memory (SRAM), dynamic random access memory (DRAM), and so on.

A disk 870 may be operably connected to the computer 800 via, for example, through an input/output interface (e.g., card, device) 880 and the input/output port 830. The disk 870 may be, for example, a magnetic disk drive, a solid state disk drive, a floppy disk drive, a tape drive, a Zip drive, a flash memory card, a memory stick, and so on. Furthermore, the disk 870 may be a compact disk read-only memory (CD-ROM) drive, a compact disk recordable (CD-R) drive, a compact disk rewritable (CD-RW) drive, a digital video disk read-only memory (DVD ROM), and so on. The memory 820 can store a process 890 and/or a data 860, for example. The disk 870 and/or the memory 820 can store an operating system that controls and allocates resources of the computer 800.

The bus 840 may be a single internal bus interconnect architecture and/or other bus or mesh architectures. While a single bus is illustrated, it is to be appreciated that the computer 800 may communicate with various devices, logics, and peripherals using other busses (e.g., peripheral component interconnect express (PCIE), 1394, Universal serial bus (USB), Ethernet). The bus 840 can be types including, for example, a memory bus, a memory controller, a peripheral bus, an external bus, a crossbar switch, and/or a local bus.

The computer 800 may interact with input/output devices via the input/output (I/O) interfaces 880 including the bucket logic 850 and the input/output ports 830. Input/output devices may be, for example, a keyboard, a microphone, a pointing and selection device, cameras, video cards, displays, the disk 870, the network devices 899, and so on. The input/output ports 830 may include, for example, serial ports, parallel ports, and USB ports.

The computer 800 can operate in a network environment and thus may be connected to the network devices 899 via the I/O interfaces 880, and/or the I/O ports 830. Through the network devices 899, the computer 800 may interact with a network. Through the network, the computer 800 may be logically connected to remote computers. Networks with which the computer 800 may interact include, but are not limited to, a local area network (LAN), a wide local area network (WLAN), a wide area network (WAN), and other networks.

FIGS. 9-14 show different embodiments where the apparatus 100, 300 (of FIGS. 1 and 3), the system 400, 500, 600 (of FIGS. 4, 5, 6 and 7), or combinations and equivalents thereof may be implemented. For example, the apparatus 100, 300 may be implemented in a device shown in FIGS. 9-14. In some embodiments, the apparatus 100, 300, may be implemented in a processor or a network controller in one of the devices shown in FIGS. 9-14. The examples shown in FIGS. 9-14 may also be in communication with other computer components.

Figure 9:
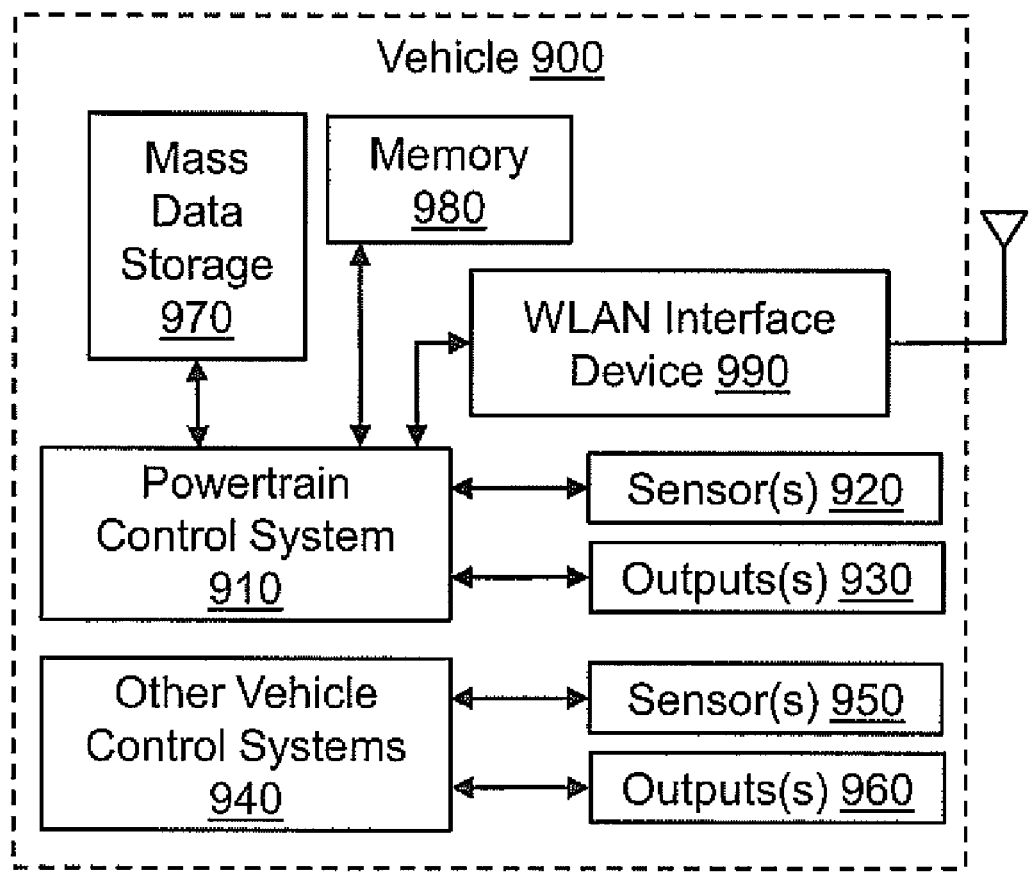
FIG. 9 illustrates an embodiment of a vehicle associated with message processing.

Referring to FIG. 9, one embodiment may be implemented in a vehicle. Some embodiments may be implemented in a control system of a vehicle 900. In some implementations, a powertrain control system 910 that receives inputs from one or more sensors 920 such as temperature sensors, pressure sensors, rotational sensors, airflow sensors and/or any other suitable sensors and/or that generates one or more outputs 930 such as engine operating parameters, transmission operating parameters, and/or other control-signals.

The example embodiment may also be embodied in other vehicle control systems 940 of vehicle 900. The other vehicle control systems 940 may likewise receive signals from input sensors 950 and/or output control signals to one or more outputs 960. In some implementations, the other control systems 940 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 910 may communicate with a mass data storage 970 that stores data in a nonvolatile manner. Mass data storage 970 may include optical and/or magnetic storage devices, for example, HDDs and/or DVDs. The HDD may be a mini HDD that includes one or more platters having a diameter that is smaller than approximately 1.8 inches. The powertrain control system 910 may be connected to a memory 980 such as RAM, ROM, low latency nonvolatile memory such as flash memory and/or other suitable electronic data storage. The powertrain control system 910 also may support connections with a WLAN via a WLAN network interface 990. In this embodiment, the example systems and methods may be implemented in this WLAN network interface 990, but other arrangements are also possible. The other vehicle control system 940 may also include mass data storage, memory and/or a WLAN interface (all not shown).

Figure 10:
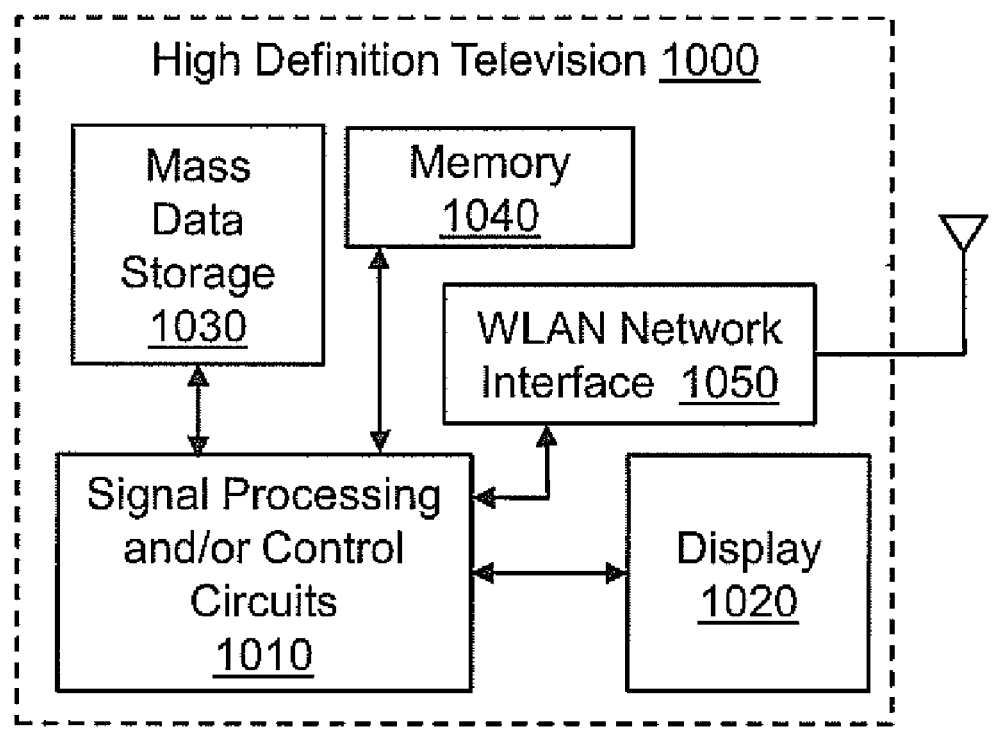
FIG. 10 illustrates an embodiment of a high definition television (HDTV) associated with message processing.

Referring now to FIG. 10, some embodiments may be implemented in a high definition television (HDTV) 1000. The example embodiment may implement signal processing and/or control circuits, which are generally identified in FIG. 10 at 1010. The HDTV 1000 receives HDTV input signals in either a wired or wireless format and generates HDTV output signals for a display 1020. In some implementations, the signal processing circuit and/or control circuit 1010 and/or other circuits (not shown) of HDTV 1000 may process data, perform coding and/or encryption, perform calculations, format data and/or perform any other type of HDTV processing that may be required.

The HDTV 1000 may communicate with a mass data storage 1030 that stores data in a nonvolatile manner by storing data in devices such as optical and/or magnetic storage devices. In some embodiments, the mass data storage 1030 may be a hard disk drive (HDD). The HDD may be a mini HDD that includes one or more platters having a diameter that is smaller than approximately 1.8 inches. HDTV 1000 may be connected to a memory 1040 such as RAM, ROM, low latency nonvolatile memory such as flash memory and/or other suitable electronic data storage. HDTV 1000 also may support connections with a wireless local area network (WLAN) via a WLAN network interface 1050. In this exemplary embodiment, example systems and methods may be implemented in this WLAN network interface 1050, but other arrangements are also possible.

Figure 11:
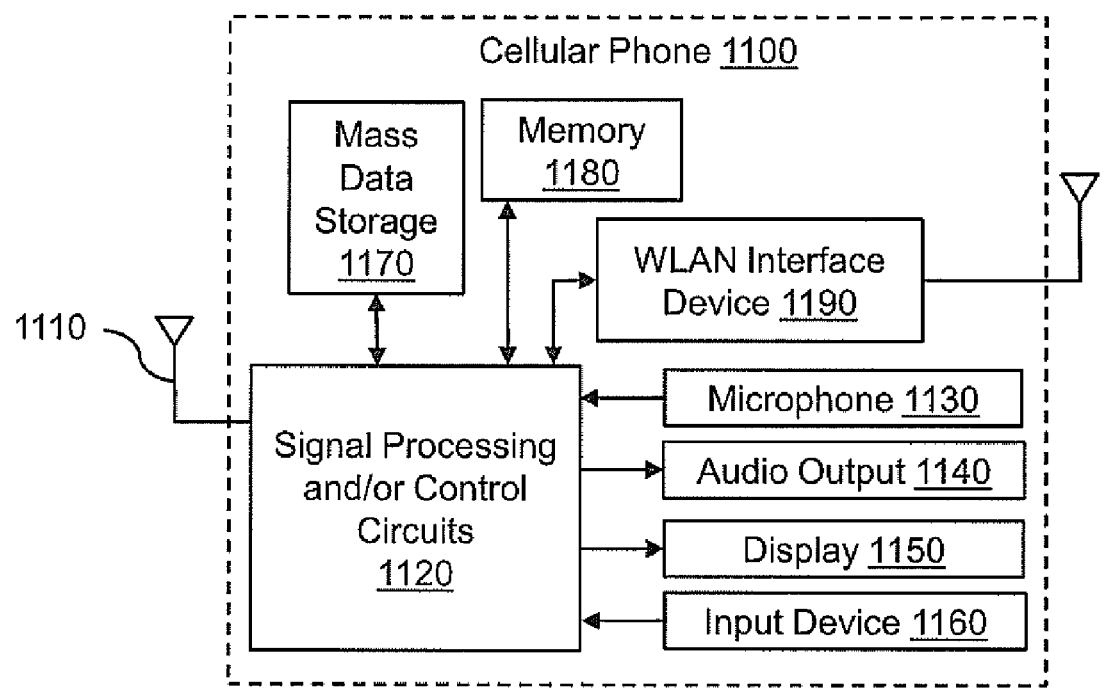
FIG. 11 illustrates an embodiment of a cellular phone associated with message processing.

Referring now to FIG. 11, some embodiments may be implemented in a cellular phone 1100 that may include a cellular antenna 1110. The example embodiment may implement signal processing and/or control circuits, which are generally identified in FIG. 11 at 1120. In some implementations, the cellular phone 1100 includes a microphone 1130, an audio output 1140 such as a speaker and/or audio output jack, a display 1150 and/or an input device 1160 such as a keypad, pointing device, voice actuation and/or other input devices. The signal processing and/or control circuits 1120 and/or other circuits (not shown) in the cellular phone 1100 may process data, perform coding and/or encryption, perform calculations, format data and/or perform other cellular phone functions.

The cellular phone 1100 may communicate with a mass data storage 1170 that stores data in a nonvolatile manner such as in optical and/or magnetic storage devices including, for example, HDDs and/or DVDs. The HDD may be a mini HDD that includes one or more platters having a diameter that is smaller than approximately 1.8 inches. The cellular phone 1100 may be connected to a memory 1180 such as RAM, ROM, low latency nonvolatile memory such as flash memory and/or other suitable electronic data storage. The cellular phone 1100 also may support connections with a WLAN via a WLAN network interface 1190. In this exemplary embodiment, example systems and methods may be implemented in this WLAN network interface 1190, but other arrangements are also possible.

Figure 12:
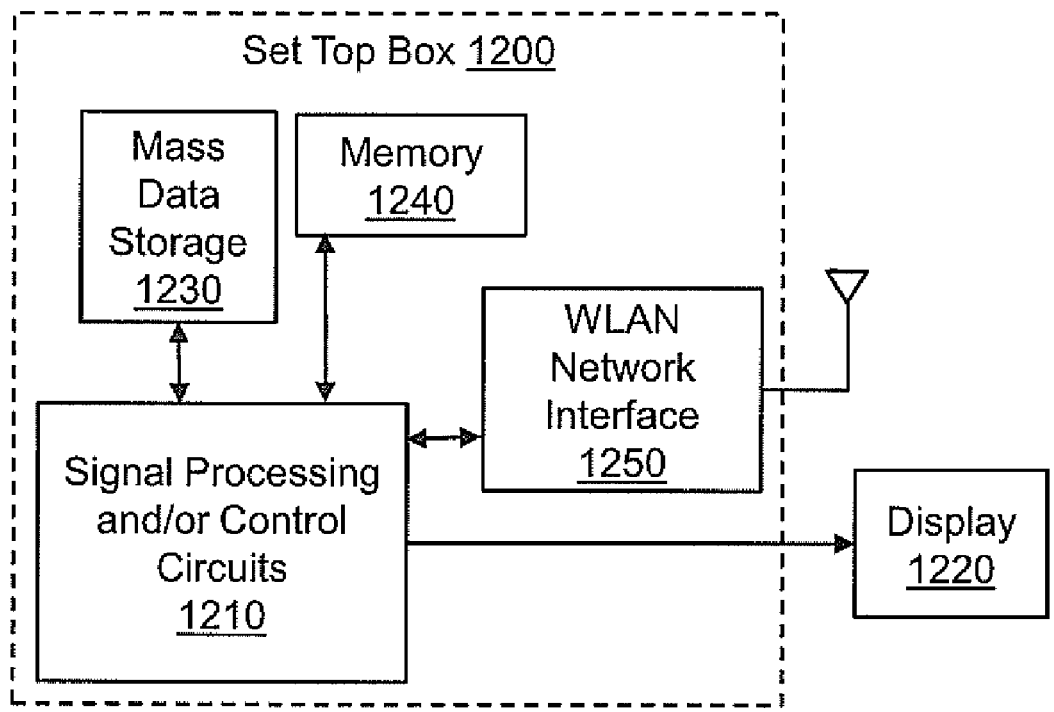
FIG. 12 illustrates an embodiment of a set top box associated with message processing.

Referring now to FIG. 12, some embodiments may be implemented in a set top box 1200. The embodiment may implement signal processing and/or control circuits, which are generally identified in FIG. 12 at 1210. The set top box 1200 receives signals from a source such as a broadband source and outputs standard and/or high definition audio/video signals suitable for a display 1220 such as a television and/or monitor and/or other video and/or audio output devices. The signal processing and/or control circuits 1210 and/or other circuits (not shown) of the set top box 1200 may process data, perform coding and/or encryption, perform calculations, format data and/or perform any other set top box function.

The set top box 1200 may communicate with a mass data storage 1230 that stores data in a nonvolatile manner. The mass data storage 1230 may include optical and/or magnetic storage devices including, for example, HDDs and/or DVDs. The HDD may be a mini HDD that includes one or more platters having a diameter that is smaller than approximately 1.8 inches. The set top box 1200 may be connected to a memory 1240 such as RAM, ROM, low latency nonvolatile memory such as flash memory and/or other suitable electronic data storage. The set top box 1200 also may support connections with a WLAN via a WLAN network interface 1250. In this embodiment, example systems and methods may be implemented in this WLAN network interface 1250, but other arrangements are also possible.

Figure 13:
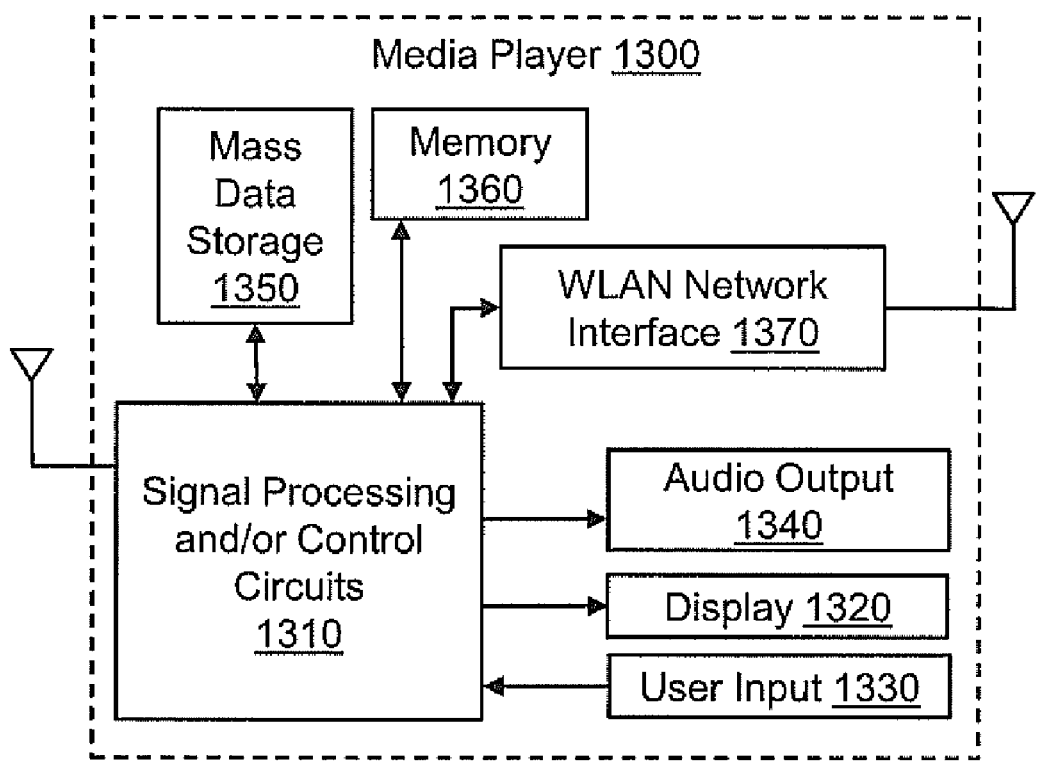
FIG. 13 illustrates an embodiment of a media player associated with message processing.

Referring now to FIG. 13, some embodiments may be implemented in a media player 1300. The embodiment may implement signal processing and/or control circuits, which are generally identified in FIG. 13 at 1310. In some implementations, the media player 1300 includes a display 1320 and/or a user input 1330 such as a keypad, touchpad and so on. In some implementations, the media player 1300 may employ a graphical user interface (GUI) that employs menus, drop down menus, icons and/or a point-and-click interface via the display 1320 and/or the user input 1330. The media player 1300 includes an audio output 1340 such as a speaker and/or audio output jack. The signal processing and/or control circuits 1310 and/or other circuits (not shown) of media player 1300 may process data, perform coding and/or encryption, perform calculations, format data and/or perform any other media player function.

The media player 1300 may communicate with a mass data storage 1350 that stores data such as compressed audio and/or video content in a nonvolatile manner. In some implementations, the compressed audio files include files that are compliant with the MP3 format or other suitable compressed audio and/or video formats. The mass data storage 1350 may include optical and/or magnetic storage devices, for example, HDDs and/or DVDs. The HDD may be a mini HDD that includes one or more platters having a diameter that is smaller than approximately 1.8 inches. The media player 1300 may be connected to a memory 1360 such as RAM, ROM, low latency nonvolatile memory such as flash memory and/or other suitable electronic data storage. The media player 1300 also may support connections with a WLAN via a WLAN network interface 1370. In this embodiment, example systems and methods may be implemented in this WLAN network interface 1370, but other arrangements are also possible. Still other implementations in addition to those described above are contemplated.

Figure 14:
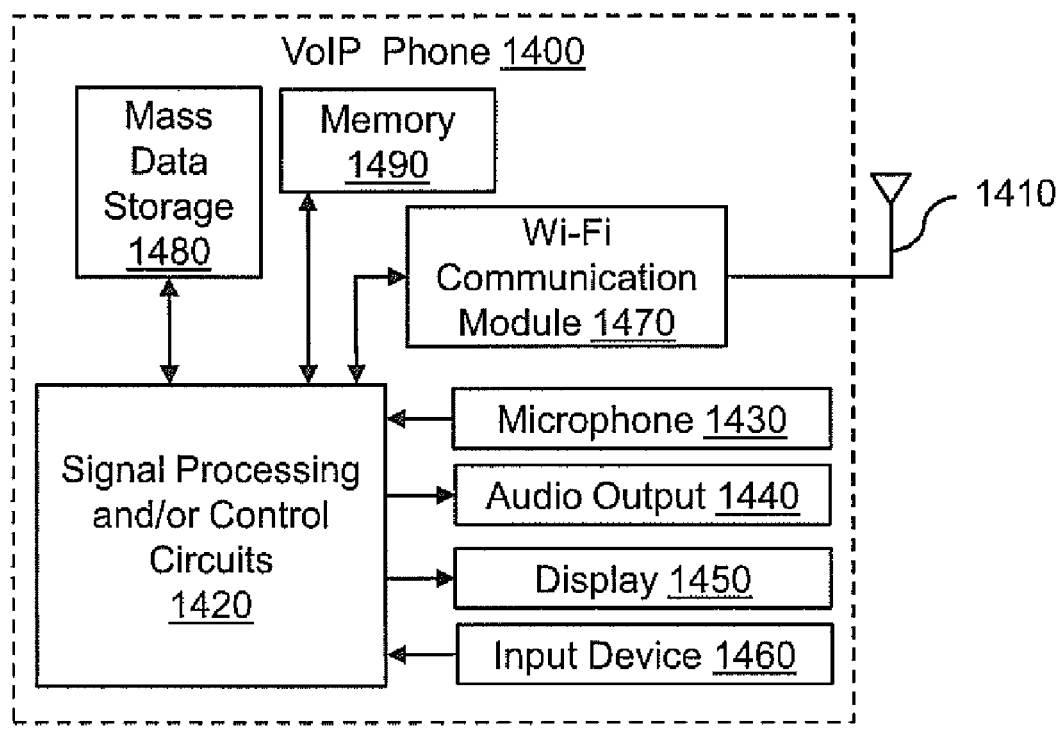
FIG. 14 illustrates an embodiment of a voice over Internet protocol (VoIP) phone associated with message processing.

Referring to FIG. 14, some embodiments may be implemented in a Voice over Internet Protocol (VoIP) phone 1400 that may include an antenna 1410. The embodiment may implement signal processing and/or control circuits, which are generally identified in FIG. 14 at 1420. In some implementations, the VoIP phone 1400 includes a microphone 1430, an audio output 1440 (e.g., speaker, audio output jack), a display 1450, an input device 1460 such as a keypad, pointing device, voice actuation and/or other input devices, and a Wireless Fidelity (Wi-Fi) communication module 1470. The signal processing and/or control circuits 1420 and/or other circuits (not shown) in VoIP phone 1400 may process data, perform coding and/or encryption, perform calculations, format data and/or perform other VoIP phone functions.

The VoIP phone 1400 may communicate with a mass data storage 1480 that stores data in a nonvolatile manner such as optical and/or magnetic storage devices, for example HDDs and/or DVDs. The HDD may be a mini HDD that includes one or more platters having a diameter that is smaller than approximately 1.8 inches. The VoIP phone 1400 may be connected to a memory 1490, which may be a RAM, ROM, low latency nonvolatile memory such as flash memory and/or other suitable electronic data storage. The VoIP phone 1400 is configured to establish communications link with a VoIP network (not shown) via Wi-Fi communication module 1470. In this embodiment, example systems and methods may be implemented in this Wi-Fi communication module 1470, but other arrangements are also possible.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

What is claimed is:

1. An apparatus, comprising:
   an interaction logic, implemented with hardware, firmware, or both, to interact with a message associated with an isochronous stream, where the message is associated with a class of information provided on the isochronous stream;
   a history logic to monitor messages associated with the class of information to determine a class history for the class of information, where the history logic is to:
   determine a bucket value associated with the class history,
   increase the bucket value when the message is received, and
   decrease the bucket value at the end of a class time slot interval associated with the isochronous stream; and
   a process logic to selectively process the messages based on the bucket value.

2. The apparatus of claim 1, where the process logic selectively processes the message by: accepting the message, rejecting the message, or accepting the message with qualifications; and
   the process logic is to accept the message when a value of the class history is below a first threshold, where the process logic is to accept the message with qualifications when a value of the class history is between the first threshold and a second threshold, and where the process logic is to reject the message when a value of the class history is above the second threshold.

3. The apparatus of claim 2, where the first threshold is a committed burst size (CBS) limit and the second threshold is an excess burst size (EBS) limit.

4. The apparatus of claim 1, where the interaction logic is to receive the message on a port, and where the history logic is to monitor messages associated with the class of information on the port.

5. An apparatus, comprising:
   a receive logic, implemented with hardware, firmware, or both, to receive a packet associated with an isochronous stream, the packet belonging to a packet class, the receive logic to add a first value to a bucket count associated with the packet class, where the packet class is associated with a class time slot interval and a quality of service property;

an interval measurement logic to subtract a second value from the bucket count at the end of the class time slot interval;
a bucket logic to determine a port utilization value based on the bucket count; and
a process logic to selectively process the packet based on the port utilization value.

6. The apparatus of claim 5, where the first value represents a packet size measured in bytes of a received packet.

7. The apparatus of claim 6, where the second value is a committed burst size (CBS) limit.

8. The apparatus of claim 5, where the apparatus is software configurable.

9. The apparatus of claim 5, further comprising a register, and where a value of the class time slot interval is selected by writing a value to the register.

10. The apparatus of claim 5, where the process logic is to selectively provision a stream of traffic associated with the packet using a stream registration protocol (SRP), where the process logic selectively provisions the stream of traffic when the port utilization value is below a threshold value.

11. The apparatus of claim 10, where the process logic is to selectively provision the stream of traffic before accepting the stream of traffic.

12. The apparatus of claim 10, where the process logic is to drop the packet when the port utilization value is above an excess burst size (EBS) limit.

13. The apparatus of claim 5, where upon determining that the port utilization value is between a first threshold and a second threshold, the process logic is to accept the packet and to forward the packet.

14. The apparatus of claim 13, where the process logic is to send a flow control message to a source of the packet.

15. The apparatus of claim 13, where upon determining that the port utilization value is above the second threshold, the process logic is to reject the packet and the process logic is to send a flow control message to a source of the packet.

16. The apparatus of claim 13, where the first threshold is a committed burst size (CBS) limit and the second threshold is an excess burst size (EBS) limit.

17. The apparatus of claim 5, where the interval measurement logic is to prevent the bucket count from going below zero by clipping negative bucket count values to zero.

18. The apparatus of claim 5, where the class time slot interval is one of, 62.5 micro-seconds, 125 micro-seconds, 250 micro-seconds, or 1 millisecond.

19. The apparatus of claim 5, where the apparatus is one of, a router, a switch, a gateway, and a network interface card (NIC).

20. The apparatus of claim 5, where the apparatus is an integrated circuit.

21. The apparatus of claim 5, where the apparatus is Institute of Electrical and Electronics Engineers (IEEE) 802.1 P compliant.

22. A method, comprising:
receiving a packet associated with an isochronous stream, the packet belonging to a packet class, where the packet class is associated with a class time slot interval and a quality of service property;
adding a packet size of the packet received to a bucket count associated with the packet class, where the addition is performed after the packet is received;
subtracting a committed burst size (CBS) limit from the bucket count, where the subtraction is performed at the end of the class time slot interval;
determining a port utilization value based on the bucket count; and
selectively processing the packet based on the port utilization value including:
upon determining that the port utilization value is below a first threshold, selectively provisioning a stream of traffic associated with the packet using a stream registration protocol (SRP);
upon determining the port utilization value is above an excess burst size (EBS) limit, dropping the packet;
upon determining that the port utilization value is between the first threshold and a second threshold, forwarding the packet and sending a flow control message to a source of the packet; and
upon determining that the port utilization value is above the second threshold, rejecting the packet and sending a flow control message to the source of the packet.

23. The method of claim 22, where the packet size is measured in bytes.

24. The method of claim 22, where the first threshold is a committed burst size (CBS) limit and the second threshold is an excess burst size (EBS) limit.

25. The method of claim 22, including preventing the bucket count from going below zero by clipping negative bucket count values to zero.

26. The method of claim 22, where token credits are added to the bucket count when the packet is received, and where token credits are subtracted from the bucket at the end of the class time slot interval.

27. The method of claim 22, where unused token credits are not flushed from the bucket count between class time slot intervals.

28. The method of claim 22, where the class time slot interval is one of, 62.5 micro-seconds, 125 micro-seconds, 250 micro-seconds, and 1 millisecond.

29. A non-transitory computer readable medium that stores instructions that when executed by a machine cause the machine to perform a method, the method comprising:
interacting with a message associated with an isochronous stream, where the message is associated with a class of information provided on the isochronous stream;
monitoring messages associated with the class of information to determine a class history for the class of information, where the determining comprises:
determining a bucket value associated with the class history,
increasing the bucket value when the message is received, and
decreasing the bucket value at the end of a class time slot interval associated with the isochronous stream; and
selectively processing the messages based on the bucket value.

* * * * *